US006544492B1

(12) United States Patent
DeBerry

(10) Patent No.: US 6,544,492 B1
(45) Date of Patent: Apr. 8, 2003

(54) REGENERATION METHOD FOR PROCESS WHICH REMOVES HYDROGEN SULFIDE FROM GAS STREAMS

(75) Inventor: David W. DeBerry, Austin, TX (US)

(73) Assignee: Crystatech, Inc., Austin, TX (US)

( * ) Notice: Subject to any disclaimer, the term of this patent is extended or adjusted under 35 U.S.C. 154(b) by 0 days.

(21) Appl. No.: 09/744,110

(22) PCT Filed: Jul. 21, 1999

(86) PCT No.: PCT/US99/16500

§ 371 (c)(1),
(2), (4) Date: Apr. 17, 2001

(87) PCT Pub. No.: WO00/05171

PCT Pub. Date: Feb. 3, 2000

Related U.S. Application Data

(60) Provisional application No. 60/093,598, filed on Jul. 21, 1998.

(51) Int. Cl.[7] .............................................. C01B 17/04
(52) U.S. Cl. ................ 423/573.1; 423/228; 423/242.7; 423/514; 423/545; 423/562; 423/565; 423/576.2
(58) Field of Search .............................. 423/228, 242.7, 423/562, 573.1, 576.2, 514, 545, 565

(56) References Cited

U.S. PATENT DOCUMENTS

| | | | |
|---|---|---|---|
| 3,591,335 A | * 7/1971 | Grimsley et al. ............ | 423/514 |
| 3,716,620 A | 2/1973 | Deschamps et al. ......... | 423/228 |
| 3,833,715 A | 9/1974 | Deschamps et al. ......... | 423/573 |
| 5,733,516 A | 3/1998 | DeBerry ...................... | 423/220 |
| 5,738,834 A | 4/1998 | DeBerry ...................... | 422/177 |

OTHER PUBLICATIONS

Streitwieser Jr., A. et al., Introduction to Organic Chemistry, 2nd Edition, Macmillan Publishing Company, New York, New York; ISBN 0–02–418050–5, 1981, p. 735.

Kohl, A.L. et al., Gas Purification, 4th Edition, Gulf Publishing Company, Houston, Texas; ISBN 0–87201–314–6, 1985, p. 487.

* cited by examiner

Primary Examiner—Stanley S. Silverman
Assistant Examiner—Timothy C. Vanoy
(74) Attorney, Agent, or Firm—Klauber & Jackson

(57) ABSTRACT

A process is provided for the removal of hydrogen sulfide out of a gaseous stream (22), such as a natural gas, by contacting the hydrogen sulfide containing gas with a sorbing liquid (26) containing a tertiary amine so that the hydrogen sulfide is sorbed into the liquid in absorber (11) and transferring the sorbing liquid/hydrogen sulfide mixture to a reactor (15) where the tertiary amine promotes the conversion of the hydrogen sulfide into polysulfide via reaction with sulfur; transferring the polysulfide solution from the reactor (15) to a regenerator (10) where polysulfide is converted into elemental sulfur via reaction with air (9); transferring at least a portion of the solution (25) containing elemental sulfur, as well as sulfate and thiosulfate species, into a mixture (36) where it is contacted with gaseous ammonia which reacts with the sulfate and thiosulfate species to produce ammonium sulfate and ammonium thiosulfate which are removed from the solution while the remaining portion of solution (25) is transferred to a sulfur recovery unit (14). That portion of the solution which has been subjected to ammonium sulfate and ammonium thiosulfate removal is rejoined with that portion of the solution (25) being forwarded to sulfur recovery unit (14). The solution from the sulfur recovery unit (14) is recycled back to the absorber (11).

11 Claims, 3 Drawing Sheets

REGENERATION METHOD FOR PROCESS WHICH REMOVES HYDROGEN SULFIDE FROM GAS STREAMS

This application was filed under 35 U.S.C. 371 as PCT/US99/16500 on Jul. 21, 1999, which claims 35 U.S.C. 119(e) benefit of U.S. provisional application No. 60/093,598 which was filed on Jul. 21,1998.

FIELD OF INVENTION

This invention relates generally to processes and systems for removing hydrogen sulfide from a gaseous stream. More specifically the invention relates to improvements in a known process and system wherein hydrogen sulfide is removed from a gaseous stream, using as an oxidizing agent a nonaqueous scrubbing liquor in which are dissolved sulfur and a reaction-promoting base.

DESCRIPTION OF PRIOR ART

In the present inventor's U.S. Pat. Nos. 5,733,516 and 5,738,834 (the entire disclosures of which are hereby incorporated by reference), a process and system are disclosed which use a sulfur-amine nonaqueous sorbent (SANS) for removal of hydrogen sulfide ($H_2S$) from gas streams. Pursuant to the said process, a sour gas stream containing $H_2S$ is contacted with a nonaqueous sorbing liquor which comprises an organic solvent for elemental sulfur, dissolved elemental sulfur, an organic base which drives the reaction converting $H_2S$ sorbed by the liquor to a nonvolatile polysulfide which is soluble in the sorbing liquor, and an organic solubilizing agent which prevents the formation of polysulfide oil-which can tend to separate into a separate viscous liquid layer if allowed to form. The sorbing liquor is preferably water insoluble as this offers advantages where water soluble salts are desired to be removed. Hydrogen sulfide ($H_2S$) gas is sorbed into this sorbing liquor where it reacts with the dissolved sulfur in the presence of the base to form polysulfide molecules. This reaction decreases the equilibrium vapor pressure of $H_2S$ over the solution, thus providing more efficient scrubbing than a physical solvent. The liquor is then sent to a reactor where sufficient residence time is provided to allow the polysulfide forming reactions to reach the desired degree of completion—i.e., resulting in a nonvolatile polysulfide which is soluble in the sorbing liquor. From the reactor, the liquor flows to a regenerator where the solution is oxidized (e.g., by contact with air), forming dissolved elemental sulfur and water (which, being insoluble, is rejected from the solution either as an insoluble liquid layer or as water vapor exiting the overhead of the regenerator or absorber). The temperature of the liquor, which up to this point is sufficient to maintain the sulfur in solution, is then lowered, forming sulfur crystals, which are easily removed by gravity settling, filtration, centrifuge, or other standard removal method. Enough sulfur remains dissolved in the liquor following separation of the sulfur crystals that when this solution is reheated and returned to the absorber for recycling in the process, a sufficient amount of sulfur is present to react with the inlet $H_2S$ gas.

The process and system for removal of hydrogen sulfide from a gaseous stream in accordance with my U.S. Pat. Nos. 5,733,516 and 5,738,834 patents thus utilize a nonaqueous sorbent liquor comprising a solvent having a high solubility for elemental sulfur, and a sufficient temperature so that solid sulfur formation does not occur either in the hydrogen sulfide absorber or in the air-sparged regenerator of the system utilized for carrying out the process. The solvent generally can have a solubility for sulfur in the range of from about 0.05 to 2.5, and in some instances as high as 3.0 g-moles of sulfur per liter of solution. The temperature of the nonaqueous solvent material is preferably in the range of about 15.degree. C. to 70.degree. C. Sulfur formation is obtained, when desired, by cooling the liquor proceeding from the air-sparged regenerator. This can for example be effected at a sulfur recovery station by cooling means present at the station. The solvent is thereby cooled to a sufficiently low temperature to crystallize enough solid sulfur to balance the amount of hydrogen sulfide absorbed in the absorber. The solubility of elemental sulfur increases with increasing temperature in many organic solvents. The rate of change of solubility with temperature is similar for many solvents, but the absolute solubility of sulfur varies greatly from solvent to solvent. The temperature change necessary to operate the process will vary primarily with the composition of the sorbent the flow rate of sorbent, and the operating characteristics of the recovery station. For most applications, a temperature difference of 5.degree. C. to 20.degree. C. is appropriate as between the temperature of the solvent material at the absorber/reactor and temperature to which the said solvent is cooled at the sulfur recovery station; but the temperature difference can in some instances be as little as 3 .degree. C. or as much as 50 .degree. C. The nonaqueous solvent comprises a solvent selected from the group consisting of 1, 2, 3, 4 tetrahydronaphthalene, N, N dimethylaniline, diphenyl ether, dibenzyl ether, terphenyls, diphenylethanes, alkylated polycyclic aromatics, and mixtures thereof.

In order to obtain a measurable conversion of sulfur and hydrogen sulfide to polysulfides, the base added to the solvent must be sufficiently strong and have sufficient concentration to drive the reaction of sulfur and hydrogen sulfide to form polysulfides. Most primary, secondary and tertiary amines are suitable bases. More particularly, amines which comprise nitrogen connected to alkane groups, alkanol groups, benzyl groups, or hydrogen (but not to phenyl) are suitable. It should be noted that while the solvent utilized requires the addition of a base to promote the reaction of sulfur and hydrogen sulfide to form polysulfides, the base and the solvent may be the same compound.

The base may be a tertiary amine. Polysulfide compounds formed in the presence of tertiary amines are much more easily converted to sulfur by air during the regeneration step than those formed from primary amines or secondary amines. The base is more preferably selected from the group consisting of 2-(dibutylamino) ethanol, N-methyldicyclohexylamine, N-methyl-diethanolamine, tributylamine, dodecyldimethylamine, tetradecyldimethylamine, hexa-decyldimethylamine, diphenylguanidine, alkylaryl polyether alcohols, and mixtures thereof. The base is present at concentrations of about 0.01M to 2.0M. Of the bases cited, 2-(dibutylamino) ethanol and N-methyldicyclohexylamine are most preferred, and are preferably present at concentrations of about 0.5 to 1.0 M.

The nonaqueous sorbing liquor, in addition to including a solvent having a high solubility for sulfur, and a base, comprises an agent suitable for maintaining the solubility of polysulfide intermediates which may otherwise separate when they are formed during operation of the process. Such solubilizing agent is preferably selected from the group consisting of benzyl alcohol, benzhydrol, 3-phenyl-1-propanol, tri(ethylene glycol), and mixtures thereof.

During operation of this SANS process, most of the $H_2S$ removed from the gas stream is converted to elemental sulfur. However, a small fraction of the absorbed $H_2S$ is oxidized further to thiosulfate and sulfate species, which are soluble in the sorbent (probably as the salt of the protonated amine). Unrestricted buildup of the sulfur oxyanion species can eventually cause an increase in the viscosity of the solution and reduce absorption rates. In its protonated form, the amine is not an effective catalyst for the absorption of $H_2S$ and subsequent conversion to polysulfide. Therefore, the regeneration process must liberate the free amine from its protonated form as well as remove the sulfate and thiosulfate. Byproduct salt buildup can also result in uncontrolled deposition of sulfate or thiosulfate salts in the system. Therefore, some means of efficient removal of thiosulfate and sulfate from the circulating solution must be employed.

Washing a portion of the sorbent with water or a mildly alkaline solution is disclosed in the U.S. Pat. Nos. 5,733,516 and 5,738,834 patents, and is a workable method. In this case, the sulfate and thiosulfate are extracted into an aqueous phase where they are more soluble. Making the aqueous phase alkaline retards the transfer of amine from the nonaqueous phase if the "free base" form of the amine is water insoluble. However, such a washing step has several disadvantages. In practice, it is difficult to avoid emulsion formation and transport of liquid water throughout the system. In addition, the need for amines and other solvent components to be water-insoluble is an undesirable restriction on selection of these components. Furthermore, large amounts of water may have a deleterious effect on the SANS process operation.

SUMMARY OF INVENTION

Now in accordance with the present invention, it has been found that the foregoing problems of the prior art SANS process can be overcome by use of a new method for removing thiosulfate and sulfate from the SANS process solution. This method is based on addition of gaseous ammonia to the process solution. Surprisingly, it has been found that the ammonium salts of thiosulfate and sulfate are quite insoluble in the nonaqueous SANS solution, in contrast to their high solubility in aqueous solutions. Therefore, bubbling ammonia into a SANS solution containing these salts results in nearly instantaneous formation of solid ammonium sulfate and ammonium thiosulfate which precipitate from the solution, thereby allowing their removal by settling, filtration, or other common solid/liquid separation methods. The reaction (for sulfate) can be written as follows, with B representing the amine ($HB^{30}$ is then the protonated amine):

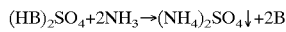

Since no water is used, this method avoids the problem of emulsion formation and transport of water around the system. In addition, the reactions appear to be essentially quantitative, and since ammonia is quite inexpensive, the removal process is economically favorable. Water soluble components can be used in the sorbent without losing them to the water wash or using other separation steps to recover them from the wash water of the earlier method.

Removal of the sulfate and thiosulfate with ammonia causes a decrease in the electrical conductivity of the solution. Thus measurement of the solution conductivity can provide a means of monitoring the status of byproduct removal and thus a means of controlling the rate of addition of ammonia.

DESCRIPTION OF PREFERRED EMBODIMENTS

Figure 1:
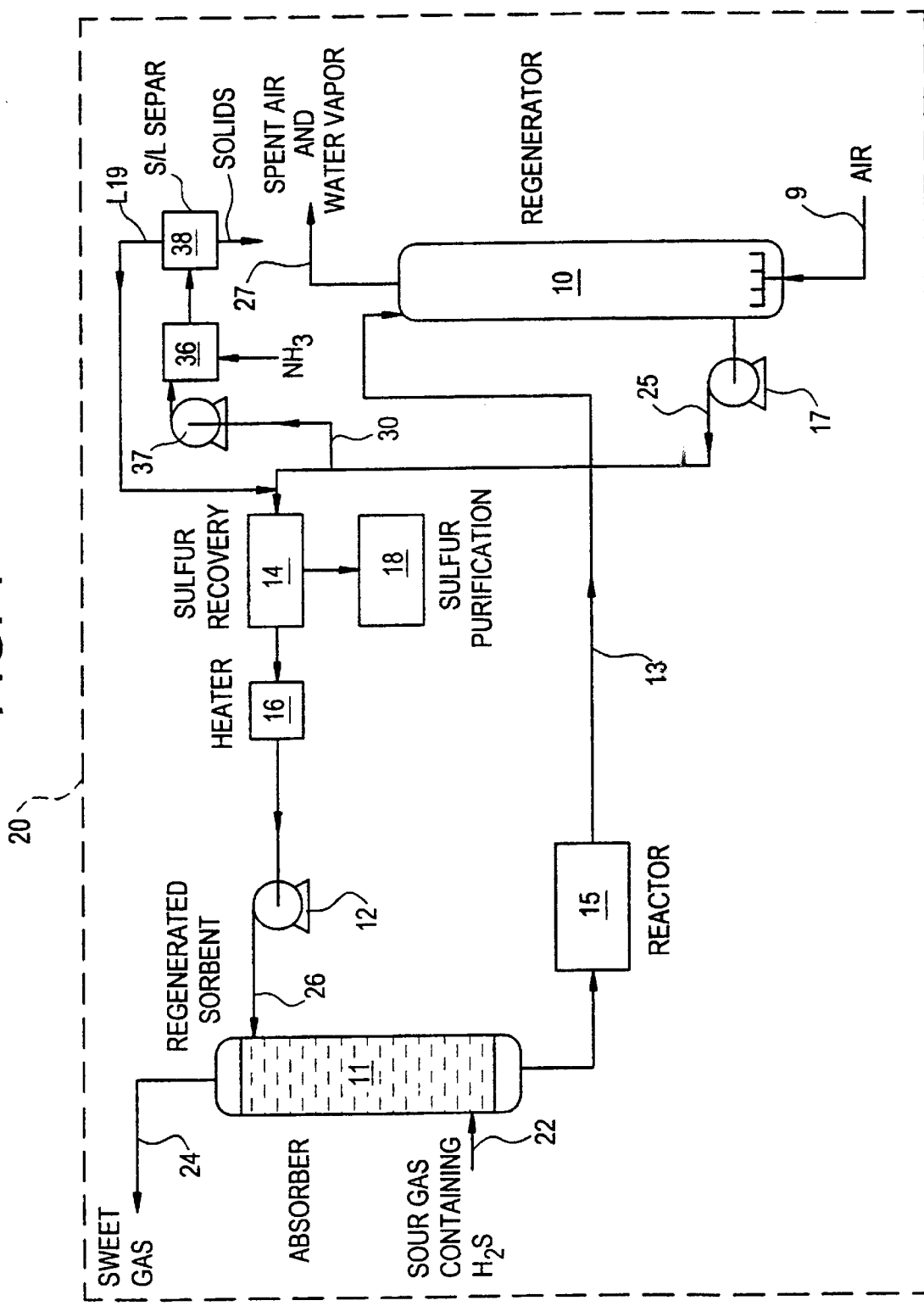
FIG. 1 is a is a schematic block diagram of a system operating in accordance with the present invention.

In FIG. 1, a schematic block diagram appears of a system 20 which may be used in practice of the present invention. The system 20 is generally similar to the systems illustrated in my aforementioned U.S. Pat. Nos. 5,733,516 and 5,738,834 patents, with the important exceptions of the portions of the system which enable removal of the undesired sulfate and thiosulfate salts. In a typical application of the invention, a gaseous stream 22 to be treated by the process of the invention is a natural or other fuel gas which typically includes 0.1 volume % to 5.0 volume % of hydrogen sulfide, which component for environmental and other reasons is desired to be minimized in or substantially removed from the gas stream. A more common parlance in the art is to measure the degree of contamination of a gas stream sought to be treated in terms of its daily production of sulfur. When viewed in this way, the streams to be treated by the invention will generally be those that produce 0.1 to 30 tons/day of sulfur. In a representative case where input stream 22 comprises a natural gas, it is provided to system 20 at a pressure of around 1,000 p.s.i. The stream 22 is passed into and through an absorber 11 where the hydrogen sulfide is effectively removed so that the output stream 24 is substantially free of hydrogen sulfide—typically concentrations of hydrogen sulfide in output stream 24 will be less than 4 ppm by volume.

Absorber 11 is a conventional liquid-gas contact apparatus at which the input gas stream 22 to be purified is passed in counter-current or other relation to a liquid sorbent liquor 26. Absorber 11 may for example take the form of a tower which is packed with porous bodies so as to provide a high surface area for the gas-liquid contact. Other absorber apparatus as are known in the art can similarly be utilized. Pursuant to the invention, the sorbent liquor 26 comprises a preferably nonaqueous solvent having a high solubility for sulfur, typically in the range of from about 0.05 to 2.5 g-moles of sulfur per liter of solution. Sorbent liquor 26 as provided to absorber 11 includes sulfur dissolved in the nonaqueous solvent in the range of from about 0.05 to 2.5 g-moles of sulfur per liter of solution, together with a base (such as the aforementioned tertiary amines) having sufficient strength and sufficient concentration in respect to that of the hydrogen sulfide and sulfur to drive a reaction between the sulfur and hydrogen sulfide which results in formation of one or more nonvolatile polysulfides which are soluble in the solvent. In order to provide sufficient residence time for the reactions forming the polysulfide, a reactor vessel 15 is preferably provided downstream of the absorber. This vessel can also be physically present in a delay section at the base of the absorber tower. The reactor vessel can be of conventional construction such as a plug flow reactor. Total residence time for the reaction, whether carried out in the absorber alone, in the absorber and the reactor, or in the reactor alone, can be in the range of 5 to 30 minutes, with 15 minutes or so being typical. The polysulfide remains in solution in the solvent, and the spent sorbing liquor including the dissolved polysulfide is conveyed via line 13 to a regenerator 10. Since it is possible for certain polysulfide intermediates to separate as their concentration increases during practice of the invention (e.g., an amine-polysulfide "red oil" where the aforementioned base is a tertiary amine), a polysulfide solubilizing agent is preferably also present in sorbing liquor 26. Benzyl alcohol is a typical such solubilizing agent; however other agents such as benzhydrol, glycol, and mixtures of these several agents are suitable; and in addition the solubilizing function can be accomplished in some instances by one of the other components of the sorbent, such as the nonaqueous solvent or the base.

It is to be appreciated that the spent sorbing liquor provided to regenerator 10 is entirely provided as a liquid phase. Substantially no solid sulfur particles are present as could cause blockages or other difficulties either at the absorber or in other portions of the system proceeding regenerator 10. At regenerator 10, the sorbing liquor at a temperature in the range of 15.degree. C. to 70.degree. C. is oxidized by contacting with an oxygenating gas, as for example by contacting with a counter current stream of air, or other means. Typically, for example, the sorbing liquor can be contacted with an ascending upwardly sparged air stream from supply line 9, which air is at a temperature of 15.degree C. to 70.degree. C. Residence time in the regenerator is typically on the order of 15 to 45 minutes, and results (in the presence of the aforementioned base) in the dissolved polysulfide being oxidized into elemental sulfur. More than 85% conversion of the polysulfide to elemental sulfur is achieved with the surprisingly short residence time indicated. Because of the high solubilizing characteristics of the solvent, and of the temperature of the solvent at regenerator 10, substantially no precipitation of the sulfur occurs at the regenerator, thereby continuing to avoid clogging and similar problems as often occur where slurries are developed. The sorbing liquor is thereupon discharged from the regenerator and proceeds through a line 25 toward a sulfur recovery station 14. Air and water vapor are discharged from regenerator at vent 27. This vent stream will likely be of acceptable environmental quality, but can be catalytically combusted if it contains large amounts of benzene or other volatile organic compound contaminant sorbed from the inlet gas.

Downstream of regenerator 10 and upstream of sulfur recovery station 14, a slipstream 30 diverted through pump 37. The sorbent liquor proceeding from regenerator 10 via line 25 contains undesired thiosulfate and sulfate species, which are soluble in the sorbent (probably as the salt of the protonated amine). In order to remove these undesired species ammonia gas is added to the liquor, preferably by bubbling the gas through the liquid. This can be accomplished e.g. by means of a simple inline mixer 36. This results in nearly instantaneous formation of solid ammonium sulfate and ammonium thiosulfate which precipitate from the solution. The reaction (for sulfate) can be written as follows, with B representing the amine ($HB^+$ is then the protonated amine):

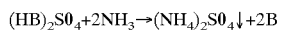

$(HB)_2SO_4 + 2NH_3 \rightarrow (NH_4)_2SO_4 \downarrow + 2B$

Temperatures for the reaction at mixer 36 can typically be in the range of from about 10 to 80° C., with the range of 15 to 70° C. being more typical. The liquor and precipitates are passed to a solid/liquid separator 38 thereby allowing removal of the solids by settling, filtration, or other common solid/liquid separation methods, with the liquid phase, i.e., the nonaqueous liquor, i.e., the now regenerated sorbent being passed via line L19 to sulfur recovery system 14, and ultimately being recycled to the absorber 11 for reuse in the cycle.

At or just prior to recovery station 14, the sorbing liquor is cooled to a sufficiently low temperature to enable solid sulfur to be precipitated. The sorbing liquor discharged from regenerator will typically have a temperature between 15.degree. to 70.degrees C. This temperature may be reduced as the sorbing liquor proceeds through line 25 but does not reach a temperature at which sulfur precipitation occurs until it approaches or reaches station 14. In any event, station 14 may comprise a cooling means such as by refrigeration or heat exchange, with the objective of reducing the temperature of the sorbent to that needed to precipitate enough sulfur to balance for the sulfur being added to the sorbent by the hydrogen sulfide. The precipitated sulfur, as it is formed from a nonaqueous solvent, generally has a larger crystal size and a higher purity and better handling characteristics than such properties for sulfur precipitated from aqueous solution. The precipitated sulfur is separated from the sorbent by separating means which form part of recovery station 14 or which can be immediately downstream of station 14. Separation can be accomplished by filtration, and/or settling and/or by centrifugation. The recovered sulfur at station 14 can be purified at a sulfur purification station 18. Residual traces of organic solvent on the sulfur crystals are removed with a solvent wash loop. Methanol can be used for such purpose, and can be recovered, distilled off and recycled in the loop.

Pumps 12 and 17 are shown positioned in the system 20 to enable circulation of the sorbent in the manner shown—these and/or other pumps (such as pump 37) can be otherwise situated within the system to sustain the desired circulation. A heating station 16 can be provided between sulfur recovery station 14 and absorber 11 to bring the sorbent back to a temperature appropriate for dissolution of the sulfur that remains with the sorbent as it is returned to absorber 11. Supplemental heating means can also be provided at other points in the system to assure that the temperature remains above the sulfur precipitation point, i.e., until the sorbing liquor reaches the point in its circulation where such precipitation is desired.

The quantities of ammonia which are added to the liquor at 36 are such as to reduce the concentration of the sulfate and thiosulfate species below a predetermined level. In general it is desirable to reduce the concentration to 0.05M or less. Since the said species act to tie up the amine and make it unavailable for its primary purposes in the invention, the more direct objective is to assure that the free amine concentration is above a predetermined level. In practice, one can treat with ammonia in such quantities as to reach and maintain stable "steady state" concentrations of sulfate and thiosulfate, and then maintain a sufficient flow rate of ammonia to maintain the sulfate and thiosulfate concentrations at or below their set points. Similarly one can periodically measure the concentration of free amine in the liquor and continue to precipitate and remove the undesired sulfate and thiosulfate species until the free amine rises to a level such that the steady state flow rate of free amine in the liquor will be in a desired ratio to the $H_2S$ entering the absorber. Each gmole of sulfate (or thiosulfate) is associated with two gmoles of protonated amine, making this amine unavailable for reaction. At least two gmoles of amine per gmole of incoming $H_2S$ are needed to promote the desired reactions. The required concentrations depend on the circulation rate of the liquor as well as other considerations. But basically, at steady state, enough ammonia is added that the molar flow rate of free amine entering the absorber 11 is at least twice the molar flow rate of $H_2S$ entering the absorber. A higher ratio may actually be used to speed up the desired reactions.

Typically at steady state operation the flow rate of free amine entering the absorber (on a mote basis) will be in a ratio to the entering (molar flow rate of) $H_2S$ of the order of 2:1 to 8:1, although somewhat higher or lower ratios can be appropriate, i.e. the ratio could be less than 2:1 if 100% removal is not necessary, or more than 8:1 where smaller absorbers are used or for very high removals.

The absolute amount of ammonia needed will depend on the "make rate" of sulfate+thiosulfate, which is some fraction of the incoming $H_2S$. Typically, the "make rate" of sulfate+thiosulfate for the process of the 516 patent is about 0.05 gmole salt per gmole $H_2S$ converted to S. In such a case one would require 2×0.05 gmole of $NH_3$ per gmole H2S absorbed. However the process of the present invention generally exhibits an order of magnitude lower make rate.

While the ammonia in FIG. 1 is shown as added upstream of the sulfur recovery station 14, and while this is an advantageous point for such addition, the ammonia can be effectively added at other points downstream of the contacting of the liquor with an oxidizing gas. Thus for example the ammonia addition could be effected immediately downstream of the sulfur recovery station 14. One of the advantages of adding the ammonia upstream of the sulfur recovery, is that in such event the solids consisting of both the sulfur and the sulfate and thiosulfate salts, can be collected together. In some uses such as in agricultural supplements, such a combination of components is deemed desirable. Similarly it will be appreciated that the two solid streams proceeding from solid/liquid separator 38 and from sulfer recovery station 14 (or from the purification means 18), could be combined into a single solids stream.

EXAMPLES

Batch Test with Synthetic Byproduct Solution. To simulate a byproduct solution containing sulfate, a 0.25 mL aliquot of concentrated sulfuric acid was added to 50 mL of a solution of 7% (v/v) N-methyldicyclohexylamine, 25% benzyl alcohol and 68% Therminol 59 (Monsanto trade mark). Before the sulfuric acid was added, the solution pH was 8.2 and the conductivity was 0.007 microS (microS= microSiemens); after the addition, the pH was 6.18 and the conductivity was 0.53 microS. The mixture in this reaction vessel was seeded with 1.00 g of ammonium sulfate solids. Ammonia gas at a flow rate of 20 cc/min was then added to the solution while monitoring the pH via a glass electrode and the conductivity of the solution using a conductivity probe. During this addition, the solution conductivity fell and the pH increased. The final conductivity was 0.05 microS and the pH rose to 9.28 after the addition of 180 cc of ammonia gas over a nine-minute period. The decrease in conductivity is indicative of the removal of the protonated amine sulfate and thiosulfate salts. The increase in pH corresponds to liberation of the free amine from its protonated form.

Gelatinous white solids precipitated from solution during the ammonia addition. Additional ammonium byproduct solids accumulated onto the seed crystals rather than the vessel walls and the pH and conductivity probes (as happens without seed crystals). After the ammonium solids were recovered from the reaction vessel, rinsed, dried, and weighed, 1.9627 g of solids were measured. This represents a yield of 81% of the theoretical increase in mass due to precipitated ammonium sulfate when the initial 1.00 g of ammonium sulfate seed crystal is taken into account.

Batch Regeneration of Spent Bench-Scale Run Solution. The reaction vessel and experimental setup was the same as that described above except that actual spent sorbent solution from a system of the type disclosed in my U.S. Pat. No. 5,738,834 was used (following 118 hours of exposure to $H_2S$ and regeneration with air). The solution was not seeded with ammonium sulfate solids prior to adding ammonia gas to the solution. Ammonia gas at about 20 cc/min was added to the solution while monitoring the pH and the conductivity. After addition of ammonia for 23 minutes, the conductivity fell from 13.0 microS to 0.49 microS and the pH rose from 3.71 to 9.66. Gelatinous white solids precipitated from solution, some accumulated on the pH probe and attached to the glass walls of the vessel (illustrating the desirability of adding seed crystals).

This batch run was repeated except that the starting spent reaction solution was seeded with 1.00 gram of ammonium sulfate solids prior to adding ammonia gas. Ammonia gas at 20 cc/min was added to the solution while monitoring the pH and the conductivity. After ammonia was added for 22 minutes, the conductivity fell from 12.5 microS to 0.22 microS, and the pH rose from 4.22 to 9.36. The experiment was initiated at room temperature. During this experiment, the temperature of the test solution rose from 23° C. to 30.5° C. Apparently heat is liberated during ammonium byproduct formation. Gelatinous white solids precipitated from solution, however, none accumulated on the pH probe or on the glass walls of the vessel.

Continuous Flow Bench-Scale Run with Controlled $NH_3$ Addition. A run was conducted to demonstrate that the process can be continually regenerated by ammonia addition. Byproducts were removed by ammonia gas addition which was automatically controlled by monitoring the solution conductivity. A schematic diagram of the process is shown in FIG. 1.

The sorbent contained 0.5 M sulfur, 0.4 M piperdineethanol, and 36% phenethyl alcohol dissolved in Therminol 59 (Monsanto trade name). The gas stream was composed of 57% $CO_2$ and 43% $H_2S$. The process control computer program and the process hardware were modified to automatically control the addition of ammonia to the process and thus continually regenerate the solution. The computer program controlled ammonia addition based on the conductivity of the sorbent. When the conductivity in the settler exceeded 5.0 microS, the ammonia valve was opened, allowing ammonia gas to flow into the process stream. When the conductivity fell below 4.0 microS, the ammonia gas valve was closed and ammonia addition was stopped.

Figure 2:
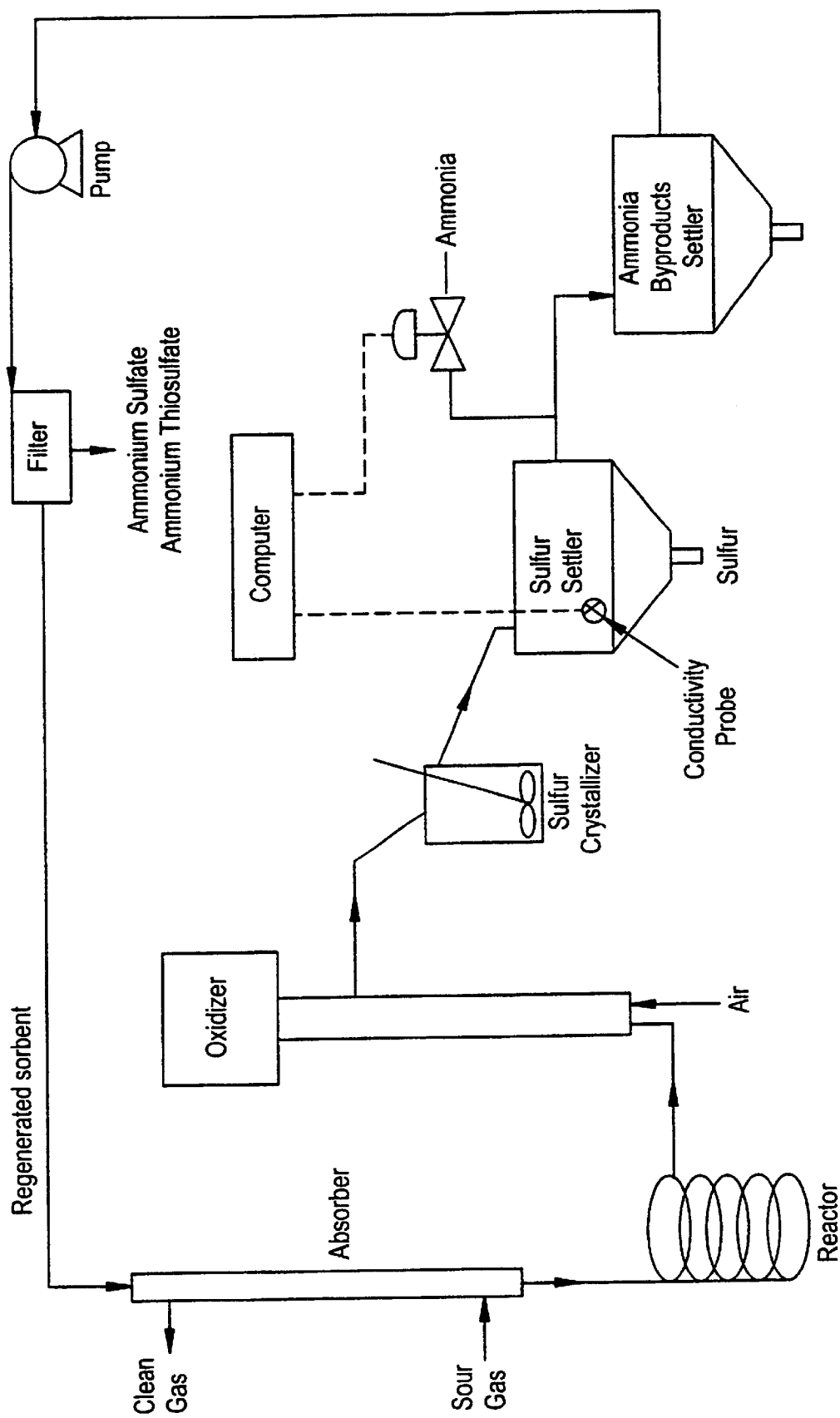
FIG. 2 is a schematic block diagram of a test system operating in accordance with the present invention.
Figure 3:
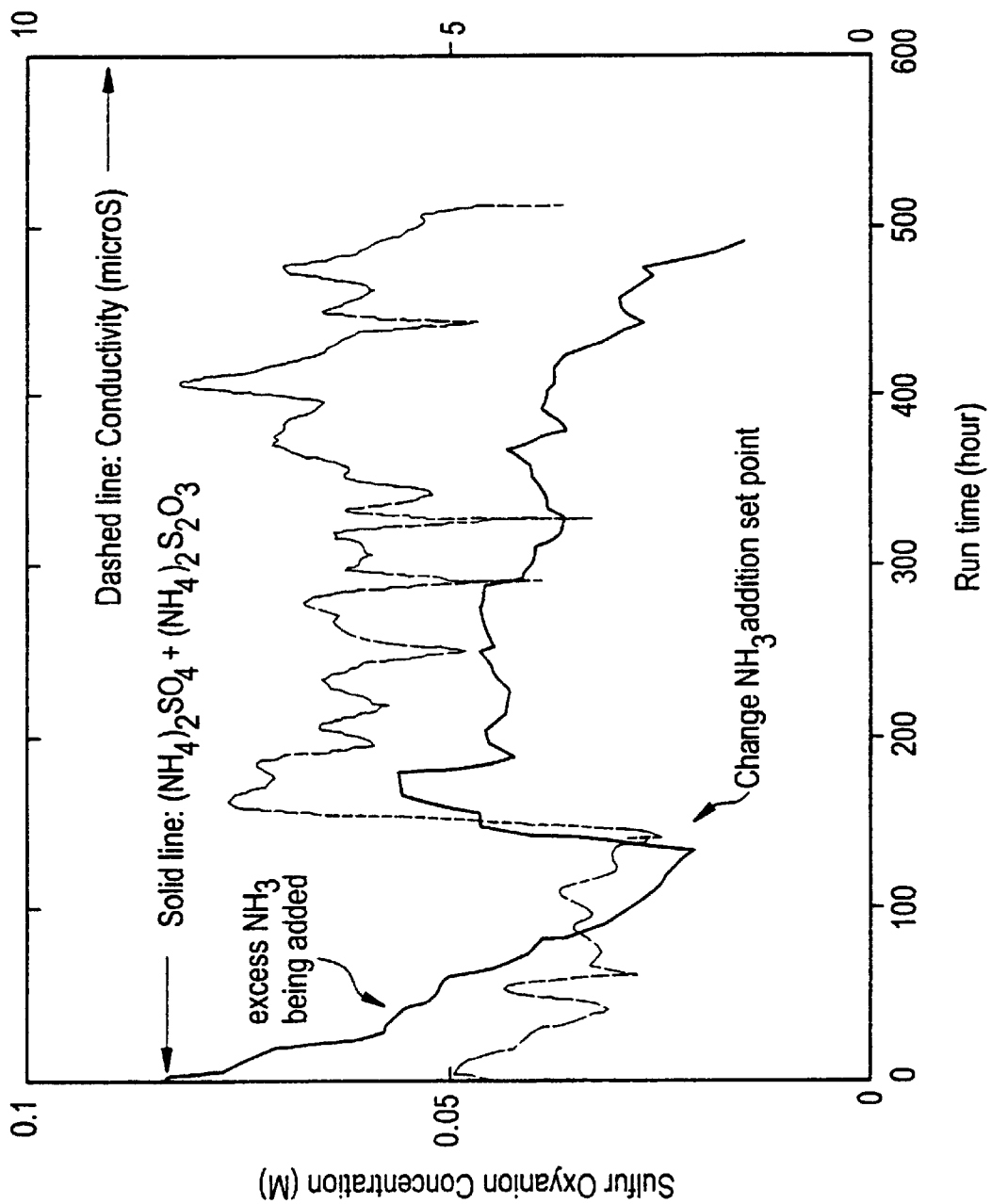
FIG. 3 is a graph depicting the variation of byproduct concentrations with time, for the test system of FIG. 2.

The variation of byproduct concentrations with time are shown in FIG. 2. The initial concentrations of sulfate and thiosulfate are high because we first operated the unit for 33.3 hours without adding ammonia in order to build up the byproduct level. Once ammonia addition was initiated, the sulfate and thiosulfate concentrations decreased steadily for the first 140 hours because we operated the ammonia addition controls at maximum conductivity set point of 2.0 microS. This resulted in the addition of more ammonia than was needed to compensate for the byproduct formation rate. Starting at 140 hours, the ammonia addition system was operated at a maximum conductivity set point of 5.0 microS, resulting in relatively steady concentrations of sulfate and thiosulfate.

Potentiometric titrations were performed on samples gathered from the bench-scale process before and after the addition of ammonia. Potentiometric titration plots of pH versus volume of standard acid added clearly show that the amount of free amine is substantially reduced by the buildup of sulfate and thiosulfate, corresponding to 2 moles of amine per mole of sulfate or thiosulfate. Potentiometric titrations done after the addition of ammonia show that the free amine content has been essentially restored.

Inline filters were used to capture 948 grams of ammonium byproduct solids during this run. Assuming that the solid is exclusively ammonium sulfate, this mass accounts for 89% of the ammonia added to the process.

Verification of Byproduct Solids from Ammonia Addition. Solids formed in the process solution were sampled and analyzed by x-ray diffraction. Samples were taken from spent sorbent solutions for processes run in accordance with U.S. Pat. No. 5,733,516, and the batch-scale tests during which sulfuric acid was added to the process stream to simulate byproduct production. All of the results indicated that the solid material formed on ammonia addition is composed of ammonium sulfate and to a lesser extent ammonium thiosulfate. Some sulfur was also noted, as would be expected from residual crystallization in the cooler regions of the process. Ion chromatographic analyses on extracts of the solids also confirmed the presence of sulfate and thiosulfate.

While the invention has been set forth in terms of specific embodiments thereof, it will be appreciated in view of the instant disclosure that numerous variations upon the invention are now enabled to those skilled in the art, which variations yet reside within the present teachings. Accordingly the present invention is to be broadly construed, and limited only by the scope and spirit of the claims now appended hereto.

I claim:

1. In a process for removing $H_2S$ from a gaseous stream by the steps of:

(a) contacting the $H_2S$-containing gaseous stream with a sorbing liquor comprising a nonaqueous solvent containing dissolved sulfur, and a base consisting essentially of a tertiary amine having sufficient strength and concentration to drive the reaction converting $H_2S$ sorbed by said liquor and reacting with said dissolved sulfur, to form nonvolatile polysulfide which is soluble in the sorbing liquor; (b) converting the dissolved nonvolatile polysulfide in said sorbing liquor to sulfur which remains dissolved in said liquor by contacting said liquor from step (a) with an oxidizing gas; (c) converting at least part of said dissolved sulfur in the liquor from step (b) to solid particulate sulfur; and (d) separating said solid sulfur from step (c) from the liquor;

the improvement enabling removal from said liquor of undesired byproduct thiosulfate and sulfate salt species generated by oxidation of portions of said $H_2S$; said improvement comprising:

adding ammonia to said liquor at a point in the said process which is subsequent to said contacting of the liquor with said oxidizing gas, to precipitate the said undesired species as ammonium sulfate and ammonium thiosulfate; and separating the solids of the precipitates from said liquor.

2. A method in accordance with claim 1 wherein said ammonia is added by bubbling gaseous ammonia into said liquor.

3. A method in accordance with claim 1, wherein said ammonia is added to said liquor between steps (b) and (c).

4. A method in accordance with claim 1, wherein said ammonia is added in sufficient quantities to bring the concentrations of said dissolved sulfate and thiosulfate salts in said liquor below a predetermined point.

5. A process in accordance with claim 4, wherein the concentration for said salts corresponds to a desired minimum level for free amine in said liquor.

6. A method in accordance with claim 1, further including periodically measuring the concentration of free amine in said liquor and continuing to precipitate and remove said undesired species until the free amine rises to a level such that the steady state flow rate of free amine in said liquor will be in a ratio to the entering $H_2S$ of from 2:1 to 8:1.

7. A method in accordance with claim 1, further including monitoring the electrical conductivity of the liquor from which the said solids of said precipitates have been separated, and continuing to precipitate and remove said undesired species until said conductivity falls below a predetermined value.

8. A method in accordance with claim 1, wherein the sulfate and thiosulfate species are reduced to concentrations of less than 0.05M.

9. A process in accordance with claim 1 further including recycling the sorbing liquor separated from the sulfur for further contact with the $H_2S$-containing gaseous stream.

10. A process in accordance with claim 9, wherein said nonaqueous solvent has a solubility for sulfur in the range of about 0.05 to 3.0 g-moles of sulfur per liter of solution.

11. A process in accordance with claim 10, wherein enough dissolved sulfur remains in said sorbing liquor following separation of the precipitated sulfur that when said solution is returned to the absorber for recycling in the process, a sufficient amount of sulfur is present to react with the inlet $H_2S$ gas.

* * * * *